United States Patent
Rao

(10) Patent No.: US 7,228,272 B2
(45) Date of Patent: Jun. 5, 2007

(54) CONTINUOUS TIME WARPING FOR LOW BIT-RATE CELP CODING

(75) Inventor: Ajit V. Rao, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 134 days.

(21) Appl. No.: 11/032,595

(22) Filed: Jan. 10, 2005

(65) Prior Publication Data
US 2005/0131681 A1    Jun. 16, 2005

Related U.S. Application Data

(63) Continuation of application No. 09/896,272, filed on Jun. 29, 2001, now Pat. No. 6,879,955.

(51) Int. Cl.
*G10L 19/04* (2006.01)
(52) U.S. Cl. .......... 704/219; 704/220; 704/262; 704/223
(58) Field of Classification Search ......... 704/219, 704/220, 223, 262
See application file for complete search history.

(56) References Cited

U.S. PATENT DOCUMENTS

| | | | |
|---|---|---|---|
| 4,561,102 A | | 12/1985 | Prezas |
| 4,932,061 A | | 6/1990 | Kroon |
| 4,991,214 A | | 2/1991 | Freeman et al. |
| 5,091,944 A | * | 2/1992 | Takahashi .......... 704/219 |
| 5,140,638 A | | 8/1992 | Moulsley et al. |
| 5,579,434 A | * | 11/1996 | Kudo et al. .......... 704/219 |
| 5,602,959 A | * | 2/1997 | Bergstrom et al. ...... 704/205 |
| 5,648,989 A | | 7/1997 | Ko |
| 5,704,003 A | | 12/1997 | Kleijn et al. |
| 5,781,880 A | | 7/1998 | Su |

(Continued)

FOREIGN PATENT DOCUMENTS

EP    0 764 940 A2    3/1997

(Continued)

OTHER PUBLICATIONS

Kleijn, W.B. et al., "The RCELP Speech-Coding Algorithm", *European Trans. on Communication*, vol. 5, No. 5, pp. 573-582, Sep.-Oct. 1994).

(Continued)

*Primary Examiner*—Vijay B. Chawan
(74) *Attorney, Agent, or Firm*—Klarquist Sparkman, LLP

(57) ABSTRACT

A signal modification technique facilitates compact voice coding by employing a continuous, rather than piece-wise continuous, time warp contour to modify an original residual signal to match an idealized contour, avoiding edge effects caused by prior art techniques. Warping is executed using a continuous warp contour lacking spatial discontinuities which does not invert or overly distend the positions of adjacent end points in adjacent frames. The linear shift implemented by the warp contour is derived via quadratic approximation or other method, to reduce the complexity of coding to allow for practical and economical implementation. In particular, the algorithm for determining the warp contour uses only a subset of possible contours contained within a sub-range of the range of possible contours. The relative correlation strengths from these contours are modeled as points on a polynomial trace and the optimum warp contour is calculated by maximizing the modeling function.

20 Claims, 8 Drawing Sheets

U.S. PATENT DOCUMENTS

| | | | |
|---|---|---|---|
| 5,886,276 | A | 3/1999 | Levine et al. |
| 5,963,897 | A * | 10/1999 | Alpuente et al. ............ 704/219 |
| 6,113,653 | A | 9/2000 | Ashley et al. |
| 6,205,421 | B1 * | 3/2001 | Morii ......................... 704/226 |
| 6,223,151 | B1 * | 4/2001 | Kleijn et al. ................. 704/207 |
| 6,240,384 | B1 * | 5/2001 | Kagoshima et al. ......... 704/220 |
| 6,262,943 | B1 | 7/2001 | Clarke |
| 6,449,590 | B1 | 9/2002 | Gao |
| 6,581,031 | B1 * | 6/2003 | Ito et al. ...................... 704/222 |
| 6,732,070 | B1 * | 5/2004 | Rotola-Pukkila et al. ... 704/219 |

FOREIGN PATENT DOCUMENTS

| | | |
|---|---|---|
| JP | 62-95599 | 2/1987 |
| JP | 62-189833 | 8/1987 |
| JP | 07-092999 | 4/1995 |
| JP | 08-328588 | 12/1996 |
| JP | 09-185398 | 7/1997 |
| JP | 10-143199 | 5/1998 |
| JP | 10-232697 | 9/1998 |
| WO | WO 00/11654 A1 | 3/2000 |
| WO | WO 00/41168 | 7/2000 |

OTHER PUBLICATIONS

Kleijn, W.B. et al., "Interpolation of the Pitch-Predictor Parameters in Analysis-by Synthesis Speech Coders", *IEEE Transaction on Speech and Audio Processing*, vol. No. 2, No. 1, Part 1 pp. 42-54, Jan. 1994.

Schroeder, Manfred R., et al, "Code-Excited Linear Prediction (CELP) High-Quality Speech at Very Low BIT Rates", Proc. *IEEE Conf. Acoust, Speech, Signal Proc., (ICASSP)* pp. 937-940 Abstract, 1995.

Makhoul, John, "Linear Prediction: A Tutorial Review", *Proceedings of the IEEE, Digital Signal Processing*, vol. 63 No. 4, pp. 561-580, Apr. 1975.

Wang, Min, "IS-127 Enhanced Variable Rate Speech Coder: Multichannel TMS320C62x Implementation", *Texas Instruments Application Report, SPRA566B*, pp. 1-14, Feb. 2000.

The IS-127 Enhanced Variable Rate Coder: A Giant Leap for CDMA, *Wainhouse Research Bulletin*, Retrieved from http://www.wainhouse.com/article_html on Feb. 6, 2001 (5 pages total).

Zhan, Puming et al., "Speaker Normalization Based on Frequency Warping", *IEEE International Conference on Acoustics, Speech and Signal Processing*, Munich, Germany, vol. 2, 4 pages total (1997).

"The Next Step", CDMA Spectrum, (Mar. 1998), retrieved from wysiwyg://9/http://www.cdg.org/library/spectrum/Mar98/handset.asp on Feb. 27, 2001 (pp. 1 of 3).

IS-127: Enhanced Variable Rate Codec, Speech Service Option 3 for Wideband Spread Spectrum Digital Systems, (Jul. 19, 1996).

Henning, et al., "EVRC for CDMA Systems", *(Slide presentation)* Slide 1-143 (Apr. 1998), retrieved from http://www.eas.asu.edu/~speech/research/cdma/cdmaapr2898/s1d001.htm on Apr. 11, 2003.

Gray, R. "Vector Quantization and Signal Compression", *Kluwer Publishing House*, (1992) pp. 1-732.

Deller, J., et al., "Discrete-time Processing of Speech Signals", *Macmillan Publishing Company* (1993) pp. 1-908.

Sugamura, N., et al., "Speech Data Compression by LSP Speech Analysis-Synthesis Technique", ABSTRACT of the transactions of IECE of Japan, vol. E 64, No. 8 (Aug. 1981) p. 555.

Cuperman et al., "A Novel Approach to Excitation Coding in Low-Bit-Rate High-Quality CELP Coder", *In Proceedings of IEEE Workshop on Speech Coding*, Sep. 2000, pp. 14-16.

* cited by examiner

CONTINUOUS TIME WARPING FOR LOW BIT-RATE CELP CODING

RELATED APPLICATIONS

This application is a continuation of U.S. application Ser. No. 09/896,272, filed Jun. 29, 2001 now U.S. Pat. No. 6,879,955, entitled: "CONTINUOUS TIME WARPING FOR LOW BIT-RATE CELP CODING," which is herein incorporated by reference in its entirety for all that it discloses without exclusion of any portion thereof.

TECHNICAL FIELD

This invention relates generally to speech coding techniques and, more particularly, relates to techniques for modifying a signal to aid in coding the signal via a low bit-rate coding technique such as codebook excited linear prediction (CELP) coding.

BACKGROUND OF THE INVENTION

In today's highly verbal and highly interactive technical climate, it is often necessary or desirable to transmit human voice electronically from one point to another, sometimes over great distance, and often over channels of limited bandwidth. For example, conversations via cell phone links or via the Internet or other digital electronic networks are now commonplace. Likewise, it is often useful to digitally store human voice, such as on the hard drive of a computer, or in the volatile or nonvolatile memory of a digital recording device. For example, digitally stored human voice may be replayed as part of a telephone answering protocol or an audio presentation.

Channels and media usable for the transmission and/or storage of digital voice are often of limited capacity, and grow more so every day. For example, the advent of quality video for use in conjunction with real time or recorded voice has created a demand for audio/video conferencing over digital networks in real time as well as for non-real time-high quality audio/video presentations, such as those receivable in streaming format and those downloadable for storage in their entirety. As video content displaces bandwidth and storage capacity in various transmission channels and storage media, the need to efficiently and properly compress both voice and video becomes imperative. Other scenarios also create a need for extreme and effective compression of voice. For example, increasingly congested cell phone links must be able to accommodate a greater number of users often over channels whose capacity has not changed in keeping with the number of users.

Whatever the motivation, the compression of voice has been and remains an important area of communication technology. Available digital voice coding techniques span a spectrum from inefficient techniques that employ no compression to efficient techniques that achieve compression ratios of four or greater. Generally, existing coders may be classified as either waveform coders or voice coders. Waveform coders actually attempt to describe the sound wave itself and typically do not achieve high rates of compression. Voice coders, or vocoders, take into account the source and peculiarities of human speech rather than simply attempting to map the resultant sound wave, and accordingly may achieve much higher compression rates, albeit at the expense of increased computational complexity. Waveform coders are generally more robust to peculiar human voices, non-speech sounds and high levels of background noise.

Most prevalent voice coders employ techniques based on linear predictive coding. The linear predictive coding technique assumes that for each portion of the speech signal there exists a digital filter that when excited by a certain signal will produce a signal much like the original speech signal portion. In particular, a coder implementing a linear predictive technique will typically first derive a set of coefficients that describe the spectral envelope, or formants, of the speech signal. A filter corresponding to these coefficients is established and used to reduce the input speech signal to a predictive residual. In general terms, the above described filter is an inverse synthesis filter, such that inputting the residual signal into a corresponding synthesis filter will produce a signal that closely approximates the original speech signal.

Typically, the filter coefficients and the residual are transmitted or stored for later and/or distant re-synthesis of the speech signal. While the filter coefficients require little space for storage or little bandwidth, e.g. 1.5 kbps, for transmittal, the predictive residual is a high-bandwidth signal similar to the original speech signal in complexity. Thus, in order to effectively compress the speech signal, the predictive residual must be compressed. The technique of Codebook Excited Linear Prediction (CELP) is used to achieve this compression. CELP utilizes one or more codebook indexes which are usable to select particular vectors, one each from a set of "codebooks". Each codebook is a collection of vectors. The selected vectors are chosen such that when scaled and summed, they produce a response from the synthesis filter that best approximates the response of the filter to the residual itself. The CELP decoder has access to the same codebooks as the CELP encoder did, and thus the simple indexes are usable to identify the same vectors from the encoder and decoder codebooks.

When the available capacity or bandwidth is ample, it is not difficult to have codebooks that are rich enough to allow for a close approximation to the original residual, however complex. However, as the available capacity or bandwidth decreases, the richness of the CELP codebooks necessarily decreases.

One way to decrease the number of bits needed to mimic the residual signal is to increase its periodicity. That is, redundancies in the original signal are more compactly representable than are non-redundant features. One technique that takes advantage of this principle is Relaxation Codebook Excited Linear Predictive coding (RCELP). An example of this technique is discussed in the article "The RCELP Speech coding Algorithm," *Eur. Trans. On Communications*, vol. 4, no. 5, pp. 573–82 (1994), authored by W. B. Kleijn et al, which is incorporated herein by reference in its entirety for all that it discloses. In particular, this article describes a method of uniformly advancing or delaying whole segments of a residual signal such that its modified pitch-period contour matches a synthetic pitch-period contour. Problems with this approach include the fact that as an artifact of the particular warping methodology, certain portions of the original signal may be omitted or repeated. In particular, if two adjacent segments of the signal experience a cumulative compressive shift, portions of the original signal near the overlap may be omitted in the modified signal. Likewise, if two adjacent segments experience a cumulative expansive shift, portions of the original signal near the overlap may be repeated in the modified signal. These artifacts produce an audible distortion in the final reproduced speech.

Other art has suggested a similar approach. See for example the article "Interpolation of the Pitch-Predictor parameters in Analysis-by-Synthesis Speech Coders," *IEEE Transactions of Speech and Audio Processing*, vol. 2, no. 1, part I (January, 1994), authored by W. B. Kleijn et al, which is incorporated herein by reference in its entirety for all that it discloses.

All pitch warping approaches suggested in the past have suffered similar shortcomings, including a reduction in quality due to the shifting of segment edges, causing omissions and repeats of the original signal. It is desired to provide a frame warping method to reduce the transmission bit rate for a speech signal, while not introducing signal repeats and omissions, and without increasing the complexity or delay of the coding calculations to the point where real-time communications are not possible.

SUMMARY OF THE INVENTION

The invention employs a continuous, rather than simply piece-wise continuous, time warp contour to modify the original residual signal to match a synthetic contour, thus avoiding edge shifting effects prevalent in the prior art. In particular, the warp contour employed within the invention is continuous, i.e. lacking spatial jumps or discontinuities, and does not invert or overly distend the positions of adjacent end points in adjacent frames.

In order to reduce the complexity of the coding algorithm to allow for practical and economical implementation, the optimum linear shift is derived via a quadratic or other approximation. In particular, the algorithm utilized within the invention to determine the ideal warp contour does not require that every possible warp contour be calculated and utilized to correlate the modified signal to the synthetic signal. In one embodiment, a subset of possible contours from across a subrange of possible contours are calculated. The relative correlation strengths from these contours are then modeled as points on a quadratic curve or other parametric function curve. The optimum warp contour, possibly represented by a point lying someplace between calculated sample points, is then calculated by maximizing the appropriate parametric function. Other simplification techniques such as bisection or piece-wise polynomial modeling may also be used within the invention.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
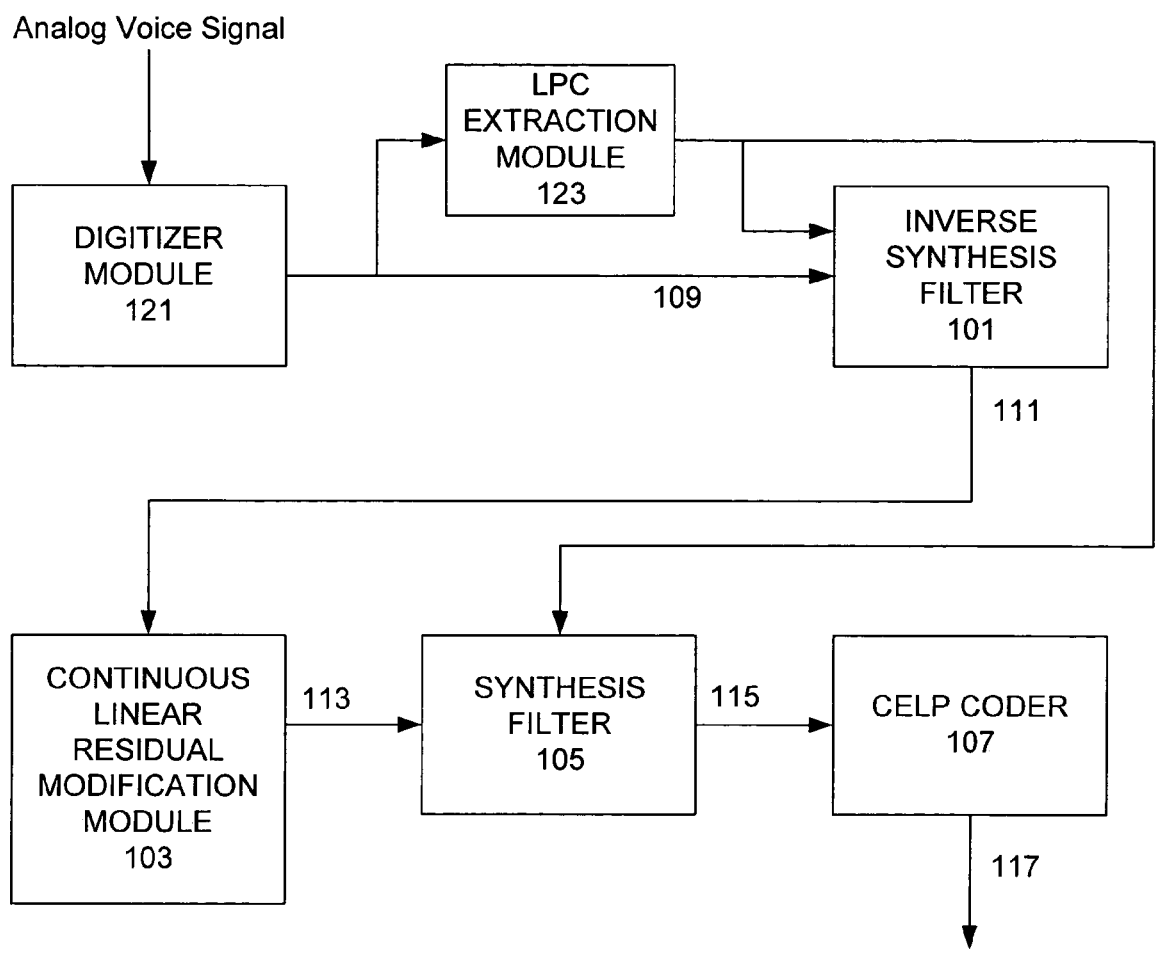
FIG. 1 is an architectural diagram of an exemplary coder within which an embodiment of the invention may be implemented.

In the description that follows, the invention will be described with reference to acts and symbolic representations of operations that are performed by one or more computers, unless otherwise indicated. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

A speech encoder is a software module operable to compress a high bit rate input digital audio signal into a lower bit rate signal which is then transmitted across a digital channel, for example the Internet, or stored in a digital memory module, for example a hard disk or CD-R. The transmitted or stored bits are converted by a speech decoder into a decoded digital audio signal. The speech encoder and decoder are often jointly referred to as a speech codec. Speech codecs are designed to produce at the decoder the closest possible reconstruction of the input audio signal, particularly when the input signal is human speech. The most common paradigm used in speech coding is codebook excited linear prediction (CELP). CELP speech coders are based on the principle of short-term prediction and codebook search. The concepts and function of CELP coding are discussed herein to aid the reader. This discussion is not intended to define CELP coding in a manner different from that known in the art.

The task of any speech coder becomes more difficult and complex at low bit-rates due to the few bits available to capture the complex and time-varying nature of human speech. This invention provides a novel methodology for modifying the input digital speech signal prior to encoding it by a speech coder such that fewer bits are required for storage or transmission. The objective of the signal modification is to simplify the structure of the input speech signal's waveform without adversely affecting the perceptual quality of the reconstructed signal. Following signal modification, the modified input speech signal is presented to the speech coder for encoding. Due to the simplified structure of the modified waveform, the speech coder can more proficiently and efficiently perform the task of encoding the signal. As mentioned previously, signal modification is especially advantageous at low bit-rates.

The signal modification technique described herein is based on a model of continuous time warping. Unlike the signal modification technique of RCELP referred to above, continuous time warping modifies the input signal using a continuous warping contour rather than simply a piece-wise continuous contour. The result is a modified speech signal whose waveform has a simple structure, and whose quality is virtually identical to that of the original input signal.

In order to fully understand the invention, it is important to understand the basic facets of the CELP family of codec techniques. Although the various CELP techniques will be well known to those of skill in the art, they will nonetheless be briefly described herein for the reader's convenience. In CELP coding, the decoded speech signal is generated by filtering an excitation signal through a time varying synthesis filter. The encoder sends information about the excitation signal and the synthesis filter to the decoder.

CELP is a waveform matching method; i.e., the choice of excitation signal is optimized via correlation of a proposed synthetic signal with the signal to be modeled, e.g. the residual. Thus, the encoder evaluates short segments of the input speech signal and attempts to generate the closest replica for each segment. In particular, the encoder first generates a set of excitation signals by combining certain allowed signals called "code-vectors". Each excitation signal in the set thus generated is passed through the synthesis filter, and the filtered excitation signal that generates the closest likeness to the original speech signal, or other signal to be replicated is selected. Following this search procedure, the encoder transmits to the decoder, information about the code-vectors that were combined to generate the selected excitation signal and information about the synthesis filter. Typically, most of the bits are required to transmit information about the code-vectors for formation of the synthesis filter excitation signal, while the synthesis filter parameters themselves typically require less than 1.5 kb/s. Thus, CELP works well at relatively high bit rates, e.g. greater than 4 kbps, where there are sufficient code-vectors to represent the complex nature of the input speech signal. At low bit-rates, due to the small number of code-vectors allowable, the quality of the reproduced signal drops considerably.

The dominant characteristic of the residual signal for the perceptually important voiced segments of speech is a sequence of roughly periodic spikes. Although these spikes are generally spaced somewhat uniformly, separated by a pitch period, there are often small jitters in the regularity of the locations of these spikes. These jitters, although not perceptually important, consume a majority of the bit budget in low bit-rate waveform coders.

As discussed, RCELP attempted to eliminate this variation by non-continuously warping the residual signal to readjust the locations of the spikes so that they occur in a regular fashion. Modifying the signal in this manner eases the task of a low bit-rate coder since very few bits are needed to send information about the locations of the spikes in the modified signal. Following residual modification, the modified residual signal is transformed back into the speech domain by passing it through an inverse of the prediction filter.

However, RCELP-based signal modification does result in a perceptible degradation of the voice quality due to the sub-optimal properties of the warping function employed. Specifically, in RCELP, potentially overlapping sections of the original residual signal, each containing a single spike, are cut and strung together to generate the modified residual signal. The cut sections may, and often do, overlap resulting in some parts of the residual signal appearing twice in the modified residual while other parts never appear at all.

The invention overcomes the undesirable properties in RCELP's residual modification procedure as discussed by utilizing a continuous time warping algorithm coupled in an embodiment of the invention with an improved warp contour optimization methodology. In summary, the inventive algorithm first identifies pieces of the original residual signal which contain a single spike, as in RCELP. However, unlike RCELP, these pieces are non-overlapping and cover the entire frame. That is, if the cut sections were concatenated, the original residual signal would be obtained—no portion of the residual signal would appear twice, and no portion would be omitted. Essentially, instead of simply cutting and moving pieces as in RCELP, the algorithm either linearly accelerates or linearly decelerates each piece in a continuous and adaptive time warping operation. The objective in warping each piece is to ensure that the spikes in the modified residual signal are separated by regular intervals thereby reducing the bit rate needed to encode the spike positions, achieving the same goal as RCELP, without its shortfalls. As will be discussed, the degree of acceleration or delay is limited to prevent degradation in the quality of the reproduced speech.

Having described the invention in generality above, the details of the preferred embodiments will be hereinafter described more fully. Referring to FIG. 1, an exemplary architecture for implementing an improved low bit rate coder according to an embodiment of the invention is illustrated. The system is comprised of a digitizer 121, a prediction filter or inverse synthesis filter 101, a linear continuous residual modification module 103, a synthesis filter 105, and a coder such as CELP coder 107, cascaded together.

The prediction filter 101 receives as input a digitized speech signal 109 from the digitizer module 121. There exist various methods known to those of skill in the art by which speech may be converted to a digital electrical signal, and accordingly such techniques will not be discussed in great detail herein. Prediction filter 101, also sometimes referred to as an inverse synthesis filter, is operable to produce a residual signal 111 based on LPC coefficients and an input signal. Those of skill in the art will be familiar with linear predictive coding concepts such as the inverse filter and residual. The residual 111 is input to the residual modification module 103, which converts the signal into a modified residual 113 in a manner to be discussed more fully hereinafter. The modified residual 113 is subsequently input to a synthesis filter 105 to generate a reproduced speech signal 115. The residual modification technique implemented by the residual modification module 103 will allow the modified speech signal 115 to sound very much like the original speech 109 even though the excitation or modified residual 113 is altered from the residual 111. Subsequently, the CELP coder module 107 codes the modified speech signal in a manner well understood by those skilled in the art, and outputs a stream of encoded bits 117 for transmission or storage.

Figure 2:
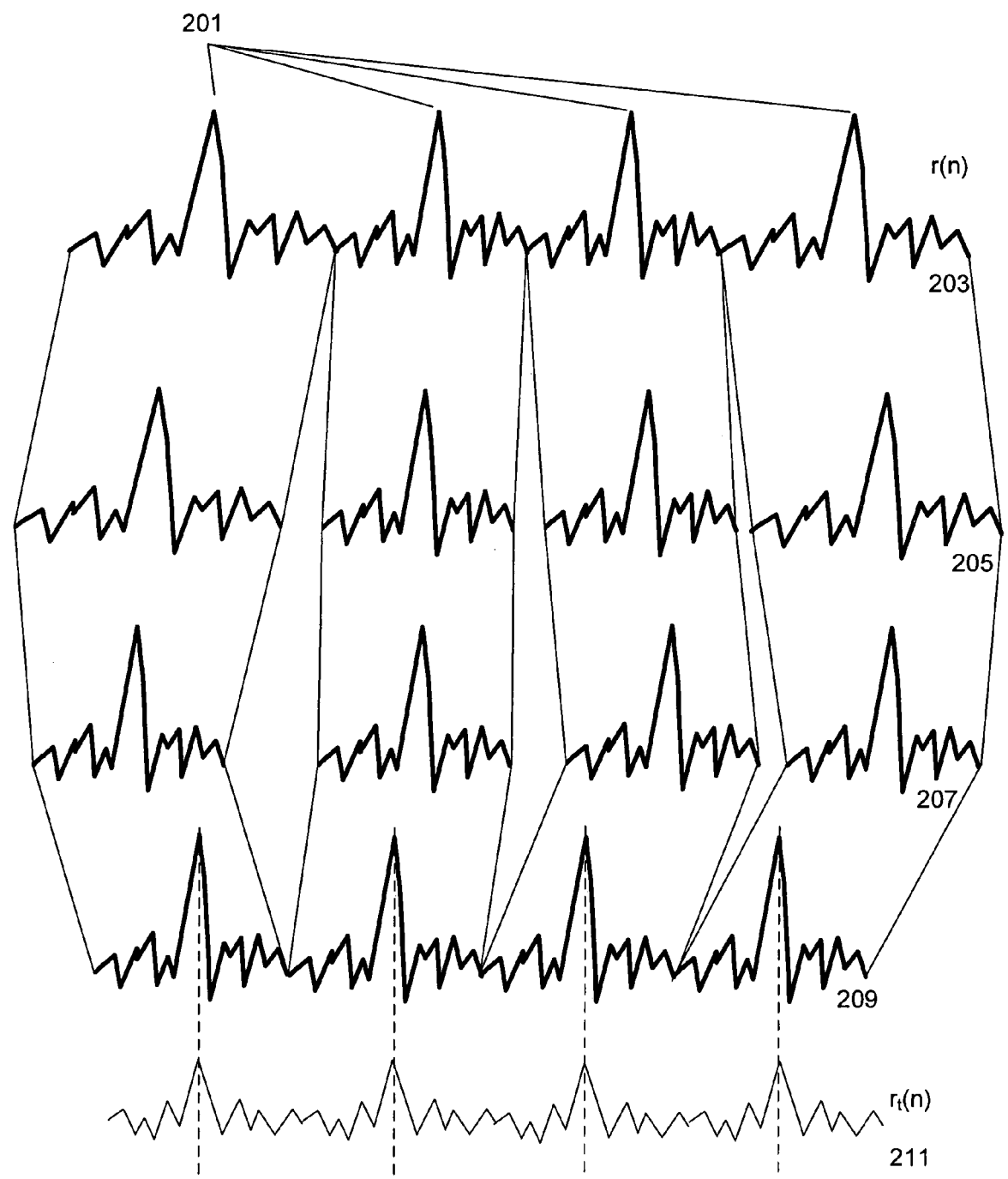
FIG. 2 is a simplified waveform diagram illustrating signal segmentation, time warping, and reconstruction within an embodiment of the invention.
Figure 3A:
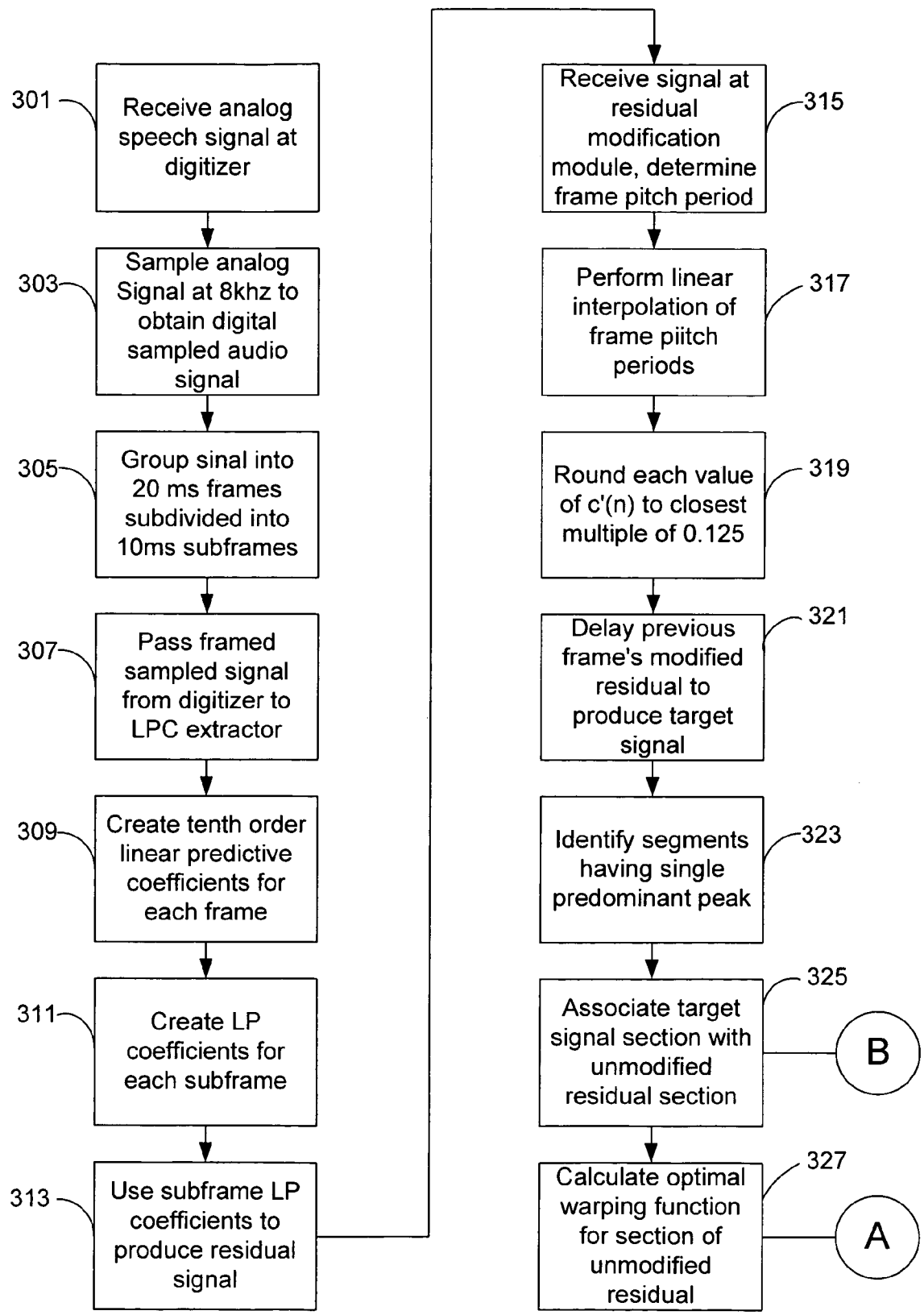
FIGS. 3a and 3b are flowcharts illustrating steps taken to effect signal modification within an embodiment of the invention.
Figure 3B:
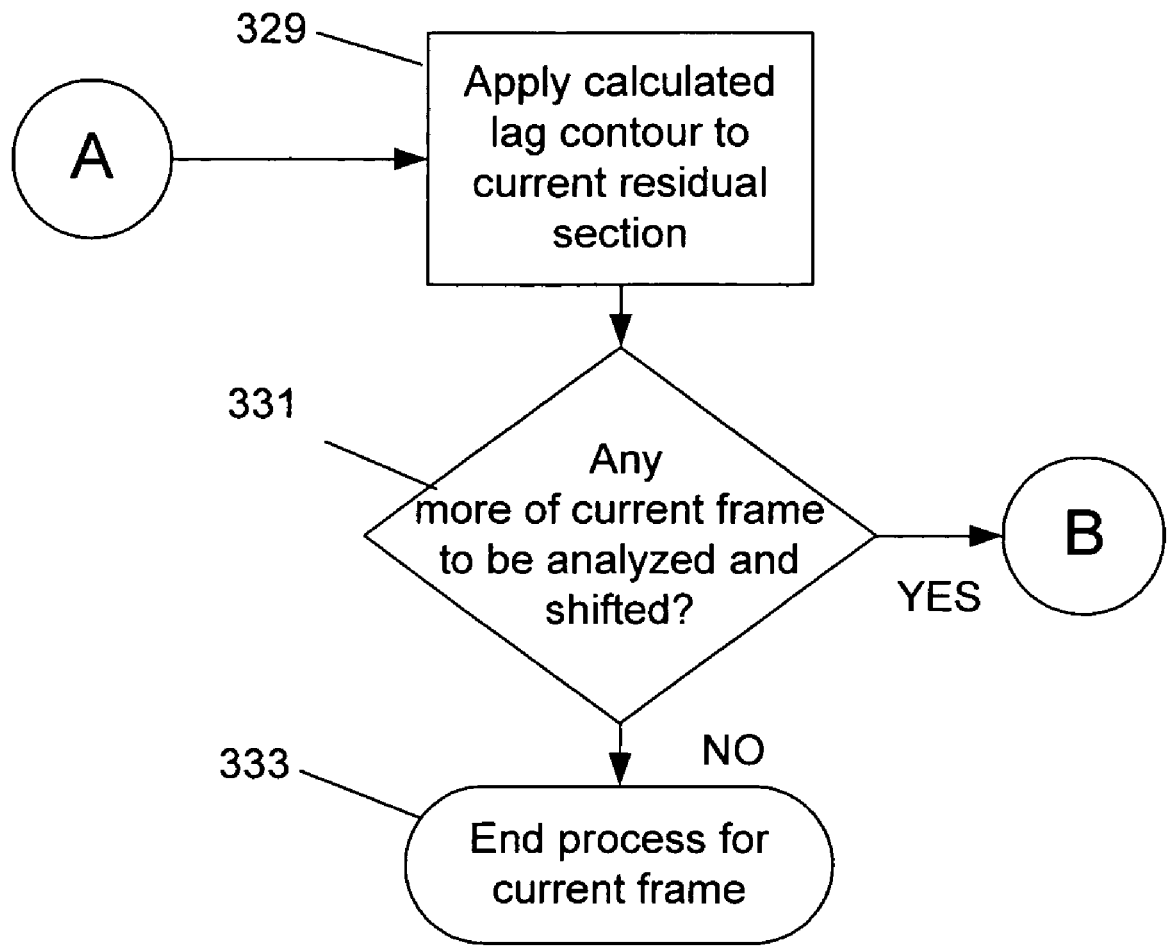

The operation of the modules illustrated in FIG. 1 will now be described in greater detail with reference to FIG. 2 in conjunction with FIGS. 3a and 3b. In particular, FIG. 2 shows simplified waveforms 203, 205, 207, 209, 211 having prominent pitch peaks 201. Note that the peak shifts illustrated in FIG. 2 are exaggerated for clarity. Actual shift amounts should be limited as will be discussed hereinafter. FIGS. 3a and 3b are flowcharts illustrating the steps executed in an embodiment of the invention to code a speech signal. At step 301, an analog speech signal 119 is received by digitizer 121. In step 303, digitizer 121 samples the signal at 8 kHz to obtain a digital sampled audio signal s(n). Subsequently, in step 305, signal s(n) is grouped into non-overlapping frames of 160 samples (20 ms) long by the digitizer, each of which is further subdivided into 2 non-overlapping subframes of 80 samples (10 ms) long. Thus, the signal in the $k^{th}$ frame is given by s(160k) . . . s(160k+ 159). The framed sampled signal 109 is passed from the digitizer 121 to the LPC extractor 123 in step 307.

The LPC extractor 123 acts in a manner well known to those of skill in the art to calculate linear predictive coefficients corresponding to the input signal. In particular, in step 309, the LPC extractor 123 extracts a set of tenth order linear predictive coefficients for each frame by performing correlation analysis and executing the Levinson-Durbin algorithm. The optimal linear prediction coefficients in the $k^{th}$ frame $a_k(j)$, j=1, . . . , 10, are interpolated in step 311 to generate a set of LP coefficients $a_{ks}(j)$, j=1, . . . , 10, in each subframe, wherein s=0, 1 corresponds to the first and second subframes respectively. The interpolation may be performed by transforming the LP coefficients into the Line Spectral Frequency (LSF) domain, interpolating linearly in the LSF domain, and transforming the interpolated subframe LSF coefficients back to LP coefficients. In step 313, the subframe LP coefficients $a_{ks}$ are used by the prediction filter 101 to produce the residual signal 111 in a manner well known to those of skill in the art. The residual 111 in the $k^{th}$ frame is represented by r(n), n=160k . . . 160k+159.

The dominant characteristic of the residual signal 111 may be seen in the waveform 203 of FIG. 2. In particular, for voiced segments, the residual 203 is dominated by a sequence of roughly periodic but irregularly spaced peaks or spikes 201. These spikes typically represent glottal pulses that excite the vocal tract during the process of generating voiced speech. The time interval between adjacent spikes is equal to the pitch period. Human speech typically has a pitch period of between about 2.5 ms and 18.5 ms. The interval between spikes is usually not constant, but instead exhibits minor irregularities or jitter.

Steps 315 through 333 will describe the operation of residual modification module 103. In step 315, the residual modification module 103 receives the residual signal 111 and determines an integer pitch period for the current frame, the $k^{th}$ frame. The pitch period may be determined by any one of a number of techniques known in the art. One technique usable within this embodiment is to employ co-relation analysis in the open loop. Whatever method is used, adequate care should be exercised to avoid undesirable artifacts such as pitch doubling.

At step 317, a sample by sample linear interpolation of the frame pitch period is performed as follows:

$$c'(n)=p(k)*((n-160k)/160)+p(k-1)*(1-(n-160k)/160),\ n=160k \ldots 160k+159.$$

The function c'(n) can be represented as a straight line from p(k−1) at the beginning of the frame to p(k) at the end of the frame. It represents a smoothly varying pitch period (floating point) for every sample in the current frame.

In step 319, a function c(n) is formed by rounding each value of c'(n) to the closest multiple of 0.125. Effectively, c(n) is a multiple of ⅛, and therefore 8*c(n) is an integer pitch period in an 8× over-sampled signal domain. Herein, c(n) is referred to as the desired pitch contour. The efficiencies engendered by modifying the residual to match this idealized contour are significant. For example, the pitch period of a frame having such a contour can be transmitted using very few bits, and the decoder can use the pitch to derive the pitch contour, and then use the pitch contour in conjunction with the spike locations from the previous frame to estimate the location of pitch spikes for the current frame.

The next process is to mimic the decoder and attempt to reconstruct the locations of the spikes in the current frame residual based on the pitch contour and the modified residual of the previous frame. Although the actual decoder will typically not have access to information about the previous frame's modified residual, it will have access to the excitation signal used to reconstruct the previous frame. Therefore, since the spikes in the excitation signal of a particular frame will align with the spikes in the modified residual of that frame, the decoder's use of the previous excitation signal does not conflict with the coder's use of the previous modified residual.

To predict the spike positions in the current frame, the residual modification module 103 uses the pitch contour to delay the previous frame's modified residual in step 321 to produce a target signal for modification, $r_t(n)$. An exemplary waveform for $r_t(n)$ is shown in FIG. 2 at element 211. This time warping function operates in the 8× over-sampled domain, using a standard interpolation filter with truncated sin c(x) impulse response and 90% pass-band, since the pitch contour c(n) is a multiple of 0.125. In particular, the 8× over-sampling is employed to obtain interpolated samples of the modified residual r'(n) in the previous frame, to arrive at the over-sampled signal as follows:

$$r''(n*0.125),\ n=160*8*(k-1) \ldots 160*8*(k-1)+1279.$$

The sample index of r″ is a multiple of 0.125, representing the over-sampled condition. Subsequently, a delay line operation is performed to obtain the target signal $r_t(n)$, as follows:

$$r_d(n*0.125)=rd(n*0.125)\ n=160*8*(k-1) \ldots 160*8*(k-1)+1279$$

$$r_d(n*0.125)=r_d(n*0.125-C(INT(n*0.125))),\ n=160*8*k \ldots 160*8+1279$$

$$r_t(n)=r_d(n),\ n=160*k \ldots 160*k+159,$$

where INT(x) represents the integer closest to x, a floating point number and $r_d(\ )$ is an intermediate signal.

Note that the decoder performs an identical delay line operation on the previous frame's excitation signal.

Having calculated the ideal pitch spike locations represented in the target signal 211, the coder can now relocate the spikes in the actual residual to match those in $r_t(n)$. Initially at step 323, the residual modification module 103 analyzes the unmodified residual signal 203 to identify distinct segments of the signal having a single predominant peak surrounded by a low energy region. An exemplary resultant waveform is represented in FIG. 2 at element 205. There are preferably no gaps between pieces of the signal as segmented. In other words, if the pieces of element 205 were to be strung back together at this stage, the result would be the unmodified residual 203. Preferably, the residual 203 is cut only at perceptually insignificant low energy points. Subsequently at step 325 the coder associates a section of the target signal with an appropriate piece of the unmodified residual.

Figure 4:
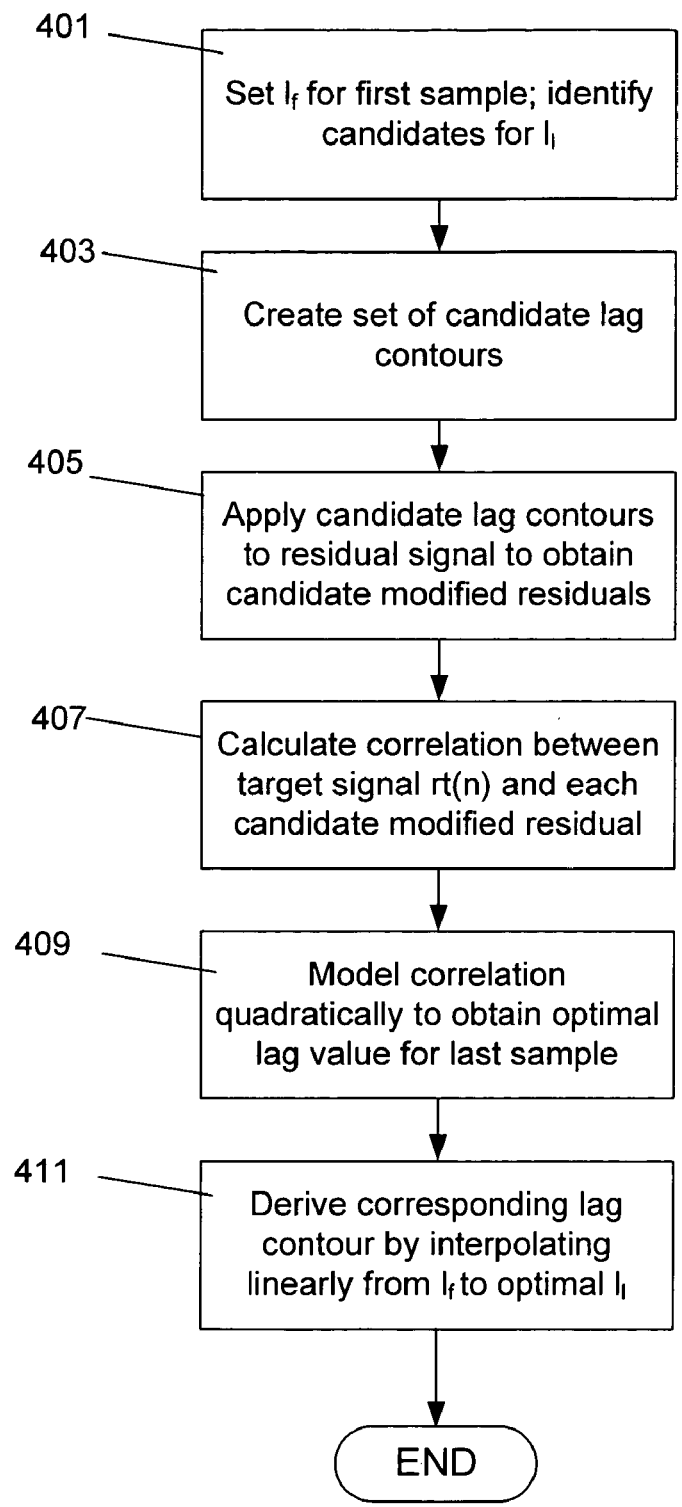
FIG. 4 is a flowchart illustrating the steps for calculating an optimal lag contour within an embodiment of the invention.

At step 327, the residual modification module 103 calculates an optimal warping function for the identified section of the unmodified residual such that modification via the optimal warping function will align a predominant spike or peak in a segment of the residual 203 with that in the associated section of the target signal 211. The steps taken to calculate an optimal warping function for each section of the residual are illustrated with reference to FIG. 4. In particular, FIG. 4 illustrates the derivation of a lag contour l(n) representing the sample-by-sample delay between the residual signal 203 and the modified residual 209. The quantity l(n) is a multiple of 0.125 such that the modified residual sample r'(m) equals the residual signal sample delayed by l(m) in the oversampled domain. That is:

$$r'(m)=r''(m-l(m)).$$

The problem of finding the optimal warp contour is reduced to the problem of finding the optimal lag contour l(n).

At step 401, the lag $l_f$ for the very first sample of the current section of interest is set equal to the lag for the very last sample of the previous section, and a set of candidates for the lag $l_l$ of the last sample of the current section is identified. In particular, a set of 2K+1 candidates for the lag $l_l$ of the last sample are identified within a candidate range, such as $\{l_f$-K, $l_f$-K+1, ... $l_f$+K$\}$. The value of K is selected based on parameters such as the computation power available, the periodicity of the speech sample, and the value of $l_f$. Typical values of K are 0, 1, 2, 3, or 4. Although the range of candidates illustrated by the above equation fall symmetrically about $l_f$, this need not be the case.

Although shifting sections of the residual by small amounts does not have a negative effect on the perceived quality of the reproduced signal, large shifts may have a perceivable negative effect. Thus, it is desirable to limit the amount by which a sample may be shifted to some small number, such as three original (not over-sampled) sample increments including any accumulated shifting as a result of the shifting of the previous section or piece. Thus, if the last sample in the previous piece was delayed by the equivalent of two sample positions, then the last sample of the current piece should not be additionally delayed more than the equivalent of one sample position, or it will experience a total shift of more than three sample positions from its original location. The solution for this problem is to limit the value of K such that it does not allow a shift beyond the desired range, or to use an asymmetrical range of candidates. Thus, in the above example, although a delay by more than one sample is prohibited, an acceleration by five sample positions may be permitted if an asymmetrical distribution of candidate lag values is utilized.

Note that fewer than all possible lag candidates are in the candidate set, because the computational power needed to evaluate all possible lag candidates would be prohibitive. Rather, only a subset of possible lag values for the last sample in the current section are used as candidates. Lag values outside of the candidate range are not included in the set, nor are values lying between candidate lag values. Thus, the optimal lag value for the last sample (and resultant lag contour) may not even be included in the candidate set itself, but it is preferably situated within the candidate range.

Next, in step 403, the coder performs a linear interpolation between the first and last samples of the current section for each candidate lag value identified in step 401 to create a set of 2K+1 candidate lag contours. A candidate lag contour represents a linear function such that the first and last values are $l_f$ and $l_l$ respectively, where $l_l$ is a candidate value. In step 405, each candidate lag contour is applied to the residual signal to obtain a set of 2K+1 candidate modified residuals, and the correlation between the target signal $r_t(n)$ 211 and each candidate modified residual is calculated in step 407.

Figure 5:
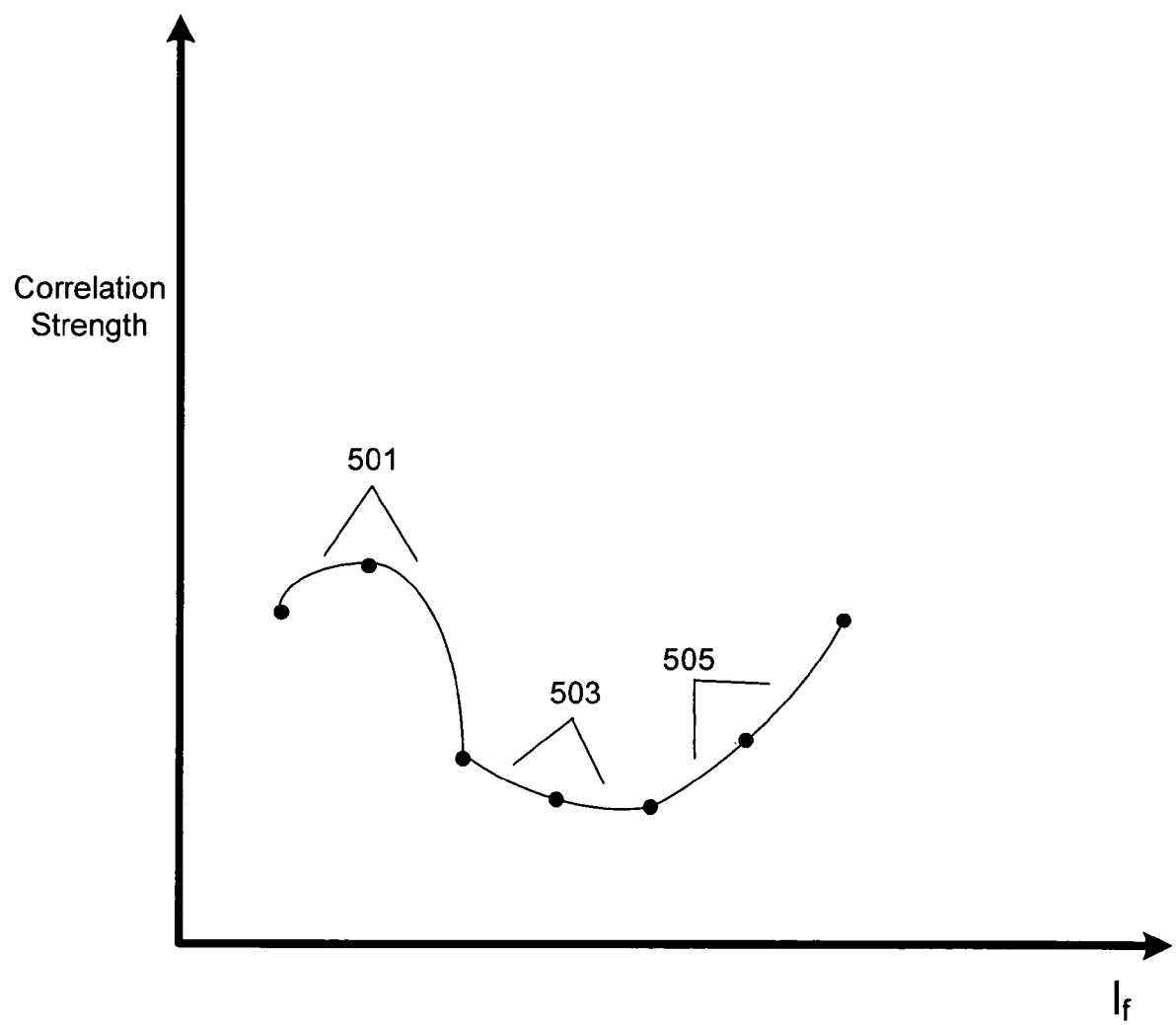
FIG. 5 is a simplified graph illustrating the plotting of correlation strength as a function of last sample lag values used within an embodiment of the invention to identify an optimal last sample lag.

In step 409, the strength of the correlation is modeled quadratically as a function of the last sample lag value, and the optimal lag value for the last sample is obtained. In particular, the strength of the correlation for each candidate modified residual is plotted as a function of the associated last sample lag value candidate as illustrated by the plot points in the graph of FIG. 5. Next the plot points are divided into sets, each set consisting of three points. There is an overlap of one point between adjacent sets. The 2K+1 plot points would be thus divided into K overlapping sets of 3 points each. For seven points, for example, there would be three sets. Each set of three consecutive plot points is modeled according to a quadratic function. In FIG. 5 for example, the three quadratic modeling functions are illustrated as 501, 503 and 505. The maximum of each quadratic function in the range from the first to the last of the associated three points is obtained, and the maximum for the entire section is then calculated. Thus, for positive quadratic functions, i.e. those concave upward, as well as for monotonic configurations of points, the maximum correlation value will lie at one of the endpoints. Note that, in general, the maximum for a given set of three points will not always lie at any of the three points, but will often lie somewhere between. Thus, the optimal lag value for the entire section could be a value that was not in the set of candidates for the lag $l_l$.

Although the plot of FIG. 5 is used herein to graphically depict steps according to an embodiment of invention, the terms "plot" or "plotting" as used herein do not require the creation of a tangible or visible graph. Rather, these terms simply imply the creation of an association between quantities, be it implicit, such as where the axes used are different parameters related to the quantities shown in FIG. 5, or explicit, and be it actual, as in a graphical program data structure, or virtual as in a set of numbers in memory from which can be derived the appropriate relationship. Therefore, these terms simply denote the creation of a relationship between the indicated quantities, however such relationship is manifested.

The maximum of all quadratics for the current correlation plot is associated with a lag value for the last sample via the appropriate quadratic, and this value is the optimal last sample lag value. It is not necessary that a quadratic function be used to model the sets of points, or that three points be used. For example, the sets could contain more than three points, and the modeling function may be a polynomial of any order, depending upon the acceptable level of complexity. Note also that for monotonic sequences of points, it is not necessary to model the sequence as a polynomial or otherwise since the highest endpoint is easily determined and represents the maximum of the sequence.

Having determined the optimal lag value for the last sample of the current dominant peak-containing section or segment of interest, the residual modification module 103 derives in step 411 a corresponding lag contour by interpolating linearly over the section from $l_f$ to the optimal $l_l$ calculated in step 409. At step 329 of FIG. 3b, the lag contour calculated in step 411 of FIG. 4 is applied to the residual as described above, that is: r'(n)=r''(n–l(n)).

Finally, at step 331, it is determined whether there are any more pieces in the current frame to be analyzed and shifted. If there are, the flow of operations returns to step 325. Otherwise, the process ends for the current frame at step 333. Element 207 of FIG. 2 illustrates the warped sections of the modified residual 209 separately for clarity. The modified residual 113 illustrated as waveform 209 is finally provided as input to the synthesis filter 105, to yield a reproduction of the original speech signal, the reproduction having regular rather than jittered pitch peaks. From this point, the signal is processed using a technique such as ordinary CELP. However, the bit rate now required to code the signal will be greatly reduced over that required to code the unmodified signal due to the increased periodicity of the pitch structure.

After a frame is processed, processing begins on the subsequent frame. In the case of an unvoiced segment, there are typically no pitch peaks, and so the methodology described herein need not be applied. During the unvoiced interval, all quantities in the algorithm are reset. For example, the indication of accumulated shift is reset to zero. When voiced speech resumes, the first voiced frame k is treated as a special case since the pitch value of the previous frame, p(k−1) is unknown in this frame. The pitch contour in this special frame k is set to a constant function equal to the pitch value of the frame, p(k). The rest of the procedure is identical to that of regular frames.

Note that techniques other than polynomial modeling may be used within the invention to calculate an optimal lag value $l_f$ and associated lag contour for a given section or piece of a speech signal within a current frame. It is only of consequence for the invention that a substantial subset of possible lag values, for example half of all possible lag values, be used to create correlation values, for this greatly reduces the computational expense of finding the optimal lag contour. Thus, alternative techniques such as bisection may be used to find the optimal lag value without trying all, or even most, possible lag values. The bisection technique entails identifying two lag candidate values, and their associated correlation strengths. The lag candidate with the higher correlation and a new lag candidate that lies in between the two lag values are used as endpoints to repeat the bisection process. The process may be terminated after a predetermined number of iterations, or when a lag value yielding a correlation strength above a predetermined threshold is found.

Figure 6:
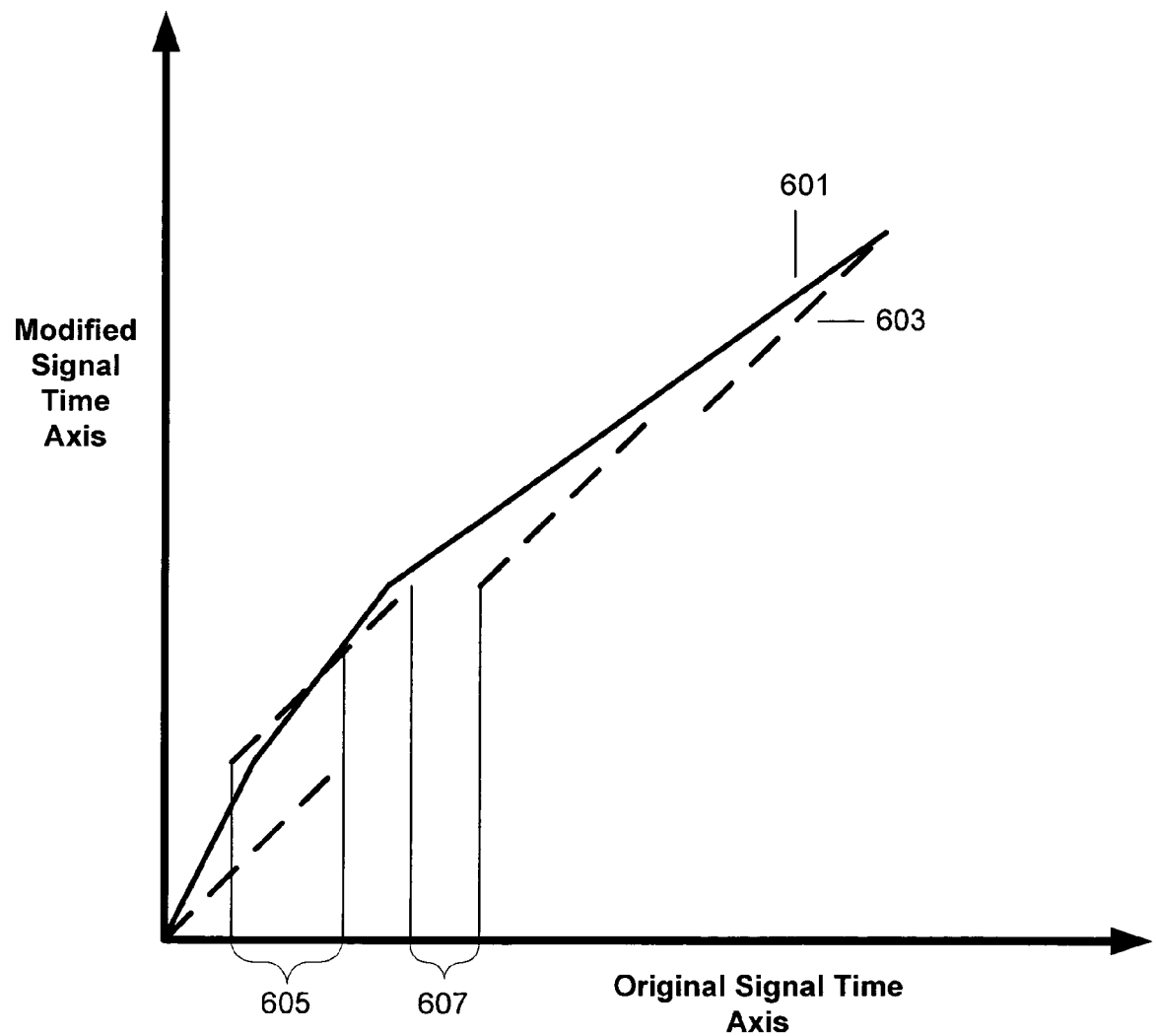
FIG. 6 is a graphical depiction of warp contours according to the prior art and according to an embodiment of the invention.

A continuous linear warp contour resulting from the methodology described herein is illustrated in FIG. 6. In particular the continuous linear warp contour 601 is shown as a solid black line, while the discontinuous contour 603 used in the prior art RCELP technique is shown as a dashed line. Both contours represent lines drawn through the set of points for signal samples plotted as a function of original time (pre-warp) versus modified time (post-warp). Thus, each straight segment in contour 601 and each separate piece of contour 603 represents a section of the original residual that has been warped according to the respective technique. It can be seen that the RCELP technique often results in missing or overlapped sections, while the continuous linear warp contour of the present invention does not permit overlap or omission. Rather, although the continuous linear warp contour 601 may contain discontinuities in slope, it is continuous rather than simply piece-wise continuous in position. In particular, region 605 is occupied by two pieces of the warp contour 603 while section 607 is devoid of data pursuant to the same contour. On the other hand, the entire signal space is occupied without overlap or omission by contour 601 according to the present invention.

Note that the warp contour 601 for adjacent segments may have the same slope or different slopes, depending upon the acceleration or deceleration needed for each segment. In contrast, the slope of each section of RCELP contour 603 is unitary. This is because RCELP shifts sections of the signal but does not change the time scale within each section. Thus it can be seen that the method according to the invention warps the time scale within each section in a linear continuous manner such that the peak of each section shifts to the desired location without creating undesirable time scale discontinuities at section edges.

Although it is not required, the present invention may be implemented using instructions, such as program "modules," that are executed by a computer. Generally, program modules include routines, objects, components, data structures and the like that perform particular tasks or implement particular abstract data types. A program may include one or more program modules.

The invention may be implemented on a variety of types of machines, including cell phones, personal computers (PCs), hand-held devices, multi-processor systems, microprocessor-based programmable consumer electronics, network PCs, minicomputers, mainframe computers and the like, or on any other machine usable to code or decode audio signals as described herein and to store, retrieve, transmit or receive signals. The invention may be employed in a distributed computing system, where tasks are performed by remote components that are linked through a communications network.

Figure 7:
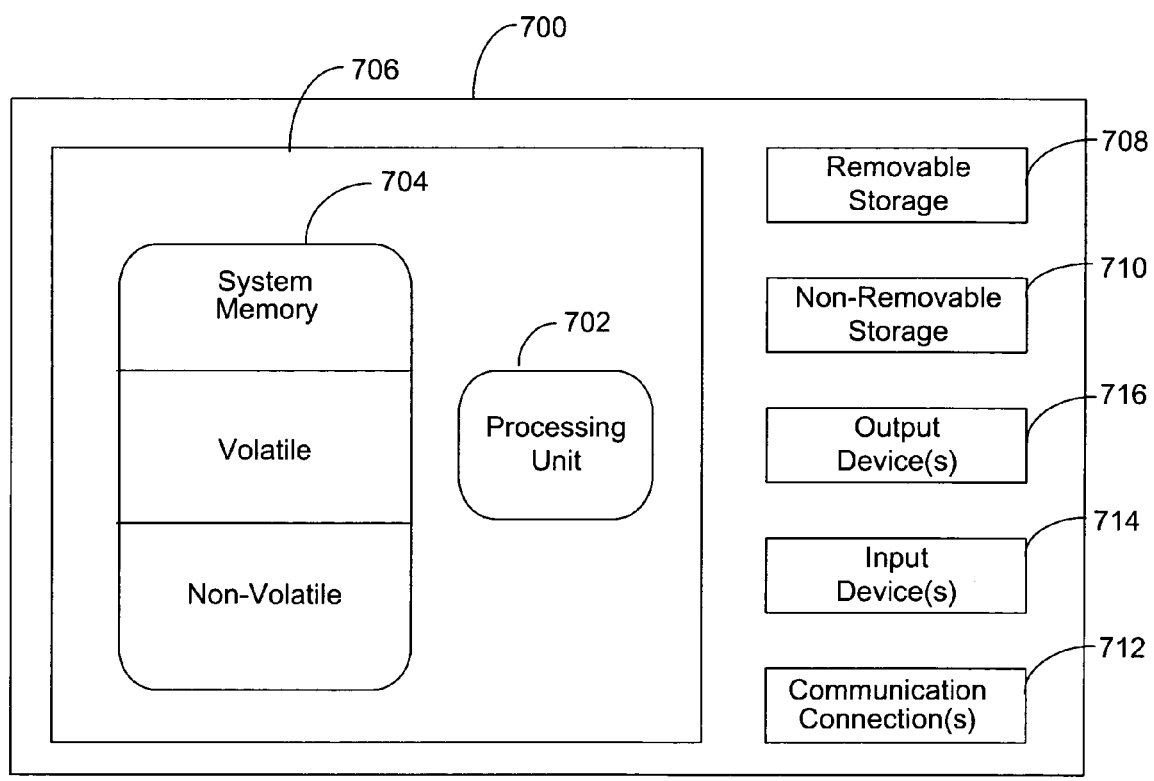
FIG. 7 is a simplified schematic diagram of a computing device upon which an embodiment of the invention may be implemented.

With reference to FIG. 7, one exemplary system for implementing embodiments of the invention includes a computing device, such as computing device 700. In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 within line 706. Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media include volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also contain one or more communications connections 712 that allow the device to communicate with other devices. Communications connections 712 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 700 may also have one or more input devices 714 such as keyboard, mouse, pen, voice input device, touch-input device, etc. One or more output devices 716 such as a display, speakers, printer, etc. may also be included. All these devices are well known in the art and need not be discussed at greater length here.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. An apparatus for modifying a speech signal prior to coding the speech signal, the apparatus comprising:
   a linear prediction coefficient extraction module for receiving a digital speech signal and for producing a set of linear prediction coefficients;
   an inverse synthesis filter for receiving the digital speech signal and the linear prediction coefficients and for producing a residual signal;
   a residual modification module for time warping the residual signal based on a continuous linear warp contour selected from the set of all possible warp contours by calculating only a subset of all possible warp contours, whereby a modified residual signal having a regular rather than irregular array of dominant peaks is produced, wherein no portion of any section of the residual is omitted or repeated in the modified residual; and a synthesis filter for receiving the modified residual signal and the linear prediction coefficients for producing a modified digital speech signal suitable for low bit rate coding.

2. The apparatus according to claim 1, further comprising a codebook excited linear prediction coder module for receiving the modified digital speech signal and for producing a compressed speech signal.

3. The apparatus according to claim 1, wherein the residual produced by the inverse synthesis filter comprises irregularly spaced dominant peaks and wherein the residual modification module divides the residual into a series of contiguous, non-overlapping sections, each section containing not more than one dominant peak, derives an idealized signal having a series of regularly-spaced dominant peaks located in a series of sequential sections, associates each section of the residual with a corresponding section of the idealized signal, calculates a linear continuous warp contour for each residual section based on a subset of possible last sample lag values for each residual section within a sub-range of possible last sample lag values for each residual section, and modifies the residual by applying the calculated warp contour to the sections of the residual so that any dominant peak in each section of the residual aligns with the dominant peak in the corresponding section of the idealized signal.

4. The apparatus according to claim 3, wherein the speech signal comprises at least one frame and wherein dividing the residual into a series of contiguous, nonoverlapping sections further comprises analyzing the frame to identify an integer pitch period.

5. The apparatus according to claim 4, wherein the residual modification module employs co-relation analysis in the open loop in analyzing the frame to identify an integer pitch period.

6. The apparatus according to claim 3, wherein the residual modification module calculates the subset of all possible warp contours for each residual section by establishing a first sample lag for the first sample of the residual section, identifying a set of candidates for the last sample lag for the last sample of the residual section, the set of candidates consisting of a subset of all possible last sample lag values within a sub-range of all possible last sample lag values, performing a linear interpolation between the first and last samples of the residual section for each candidate last sample lag to create a set of candidate lag contours, applying each candidate lag contour to the residual section to obtain a set of candidate modified residuals, calculating a correlation strength between each candidate modified residual and the corresponding section of the idealized signal to create a set of correlation strengths, deriving an optimal last sample lag for the residual section based on the set of correlation strengths, and deriving a linear continuous warp contour by interpolating linearly over the section from the first sample lag to the derived optimal last sample lag for the residual section.

7. The apparatus according to claim 6, wherein, in deriving an optimal last sample lag for the residual section based on the set of correlation strengths, the residual modification module segregates the set of correlation strengths into overlapping subsections as a function of the last sample lags used to derive the strengths, represents each subsection as a curve, calculates the maximum value of each curve, wherein the maximum value is selectable from the group consisting of all possible lag values within a range of possible lag values that includes the last sample lags used to derive the strengths in the subsection, and calculates the maximum correlation strength for the section based on the maximum values for the curves of the subsections.

8. The apparatus according to claim 7, wherein the curve representing each subsection is a polynomial.

9. The apparatus according to claim 8, wherein the polynomial is a quadratic function.

10. The apparatus according to claim 8, wherein the subrange of possible last sample lag values for each residual section is selected such that the greatest cumulative shift for any sample in the section upon application of the calculated warp contour will be less than four sample positions.

11. The apparatus according to claim 1, wherein the speech signal comprises at least one frame and wherein the inverse synthesis filter extracts linear prediction coefficients for the frame, interpolates the linear prediction coefficients for the frame to create linear prediction coefficients for a plurality of sub-frames of the frame, and produces a prediction residual for each sub-frame, whereby the residual signal comprises a set of subframe prediction residuals.

12. A method for using a computer to modify a speech signal prior to coding the speech signal, the method comprising:

converting speech to a digital electrical signal;

deriving a linear prediction residual signal having irregularly spaced dominant peaks from the digital electrical signal;

dividing the residual signal into a series of non-overlapping sections, each section containing a dominant peak; and continuously time warping one or more of the non-overlapping sections such that the modified residual signal comprises regularly spaced dominant peaks and all sections of the residual signal are substantially retained without repetition in the modified residual signal.

13. The method according to claim 12, wherein the step of continuously time warping one or more of the non-overlapping sections comprises:

deriving an idealized signal having a series of regularly-spaced dominant peaks located in a series of sequential sections; and associating each section of the residual signal with a corresponding section of the idealized signal.

14. The method according to claim 13, wherein the step of continuously time warping one or more of the non-overlapping sections further comprises calculating a linear continuous warp contour for one or more residual sections.

15. The method according to claim 14, wherein the linear continuous warp contour for the one or more residual sections is based on a subset of possible last sample lag values for each such section within a subrange of possible last sample lag values for each such section.

16. The method according to claim 15, wherein the step of continuously time warping one or more of the non-overlapping sections further comprises modifying the residual by applying the calculated warp contour to the one or more sections so that any dominant peak in each section of the residual signal aligns with the dominant peak in the corresponding section of the idealized signal, whereby dominant peaks of the modified residual signal are regularly spaced.

17. A computer-readable medium having thereon computer-readable instruction for performing a method of transforming a linear prediction residual signal having irregularly spaced dominant peaks derived from an audio signal to improve the compressibility of the residual signal, the instructions comprising instructions for:

dividing the residual signal into a series of non-overlapping sections, each section containing a dominant peak, and continuously time warping one or more of the non-overlapping sections such that the modified residual signal comprises regularly spaced dominant peaks and all sections of the residual signal are substantially retained without repetition in the modified residual signal.

18. The computer-readable medium according to claim 17, wherein the instructions for continuously time warping one or more of the non-overlapping sections comprise instructions for:

deriving an idealized signal having a series of regularly-spaced dominant peaks located in a series of sequential sections; and associating each section of the residual signal with a corresponding section of the idealized signal.

19. The computer-readable medium according to claim 18, wherein the instructions for continuously time warping one or more of the non-overlapping sections further comprise instructions for calculating a linear continuous warp contour for one or more residual sections.

20. The computer-readable medium according to claim 19, wherein the instructions for continuously time warping one or more of the non-overlapping sections further comprise instructions for modifying the residual by applying the calculated warp contour to the one or more sections so that any dominant peak in each section of the residual signal aligns with the dominant peak in the corresponding section of the idealized signal, whereby dominant peaks of the modified residual signal are regularly spaced.

* * * * *